(No Model.)  3 Sheets—Sheet 1.

J. SOUCEK.
TRIPLE VALVE FOR FLUID PRESSURE BRAKE SYSTEMS.

No. 518,705. Patented Apr. 24, 1894.

WITNESSES
T. J. Hogan.
F. E. Gaither

INVENTOR
Joseph Soucek,
by J. Snowden Bell,
Atty.

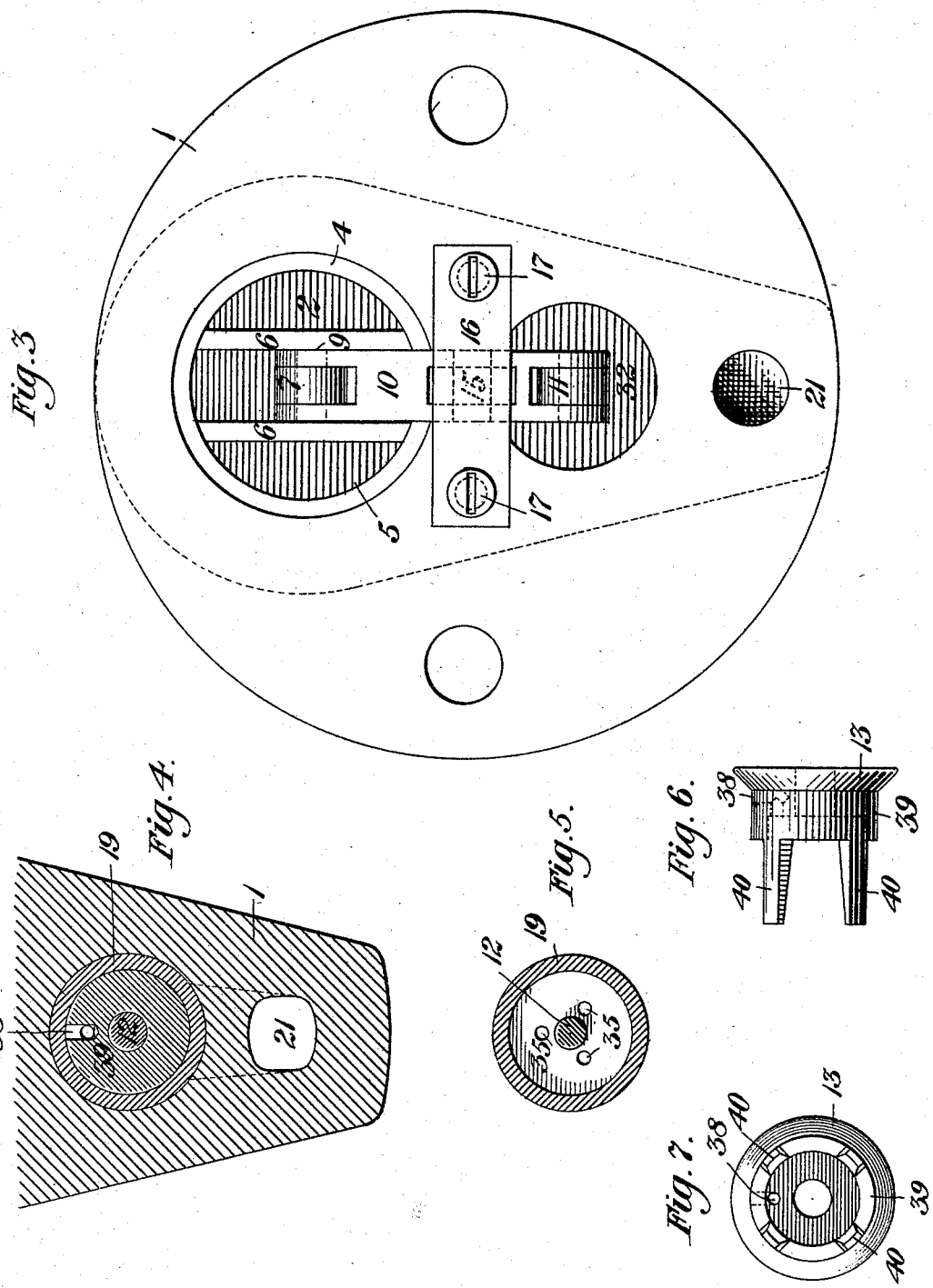

UNITED STATES PATENT OFFICE.

JOSEPH SOUCEK, OF ALLEGHENY, PENNSYLVANIA.

TRIPLE VALVE FOR FLUID-PRESSURE BRAKE SYSTEMS.

SPECIFICATION forming part of Letters Patent No. 518,705, dated April 24, 1894.

Application filed December 9, 1893. Serial No. 493,207. (No model.)

*To all whom it may concern:*

Be it known that I, JOSEPH SOUCEK, a citizen of the United States, residing at Allegheny, in the county of Allegheny and State of Pennsylvania, have invented or discovered certain new and useful Improvements in Triple Valves for Fluid-Pressure Brake Systems, of which improvements the following is a specification.

The object of my invention is to provide a new form of triple valve device for automatic fluid pressure brake systems, and to this end it consists of a new and novel construction, arrangement, and combination of parts for performing the functions of a triple valve device.

Figure 1:
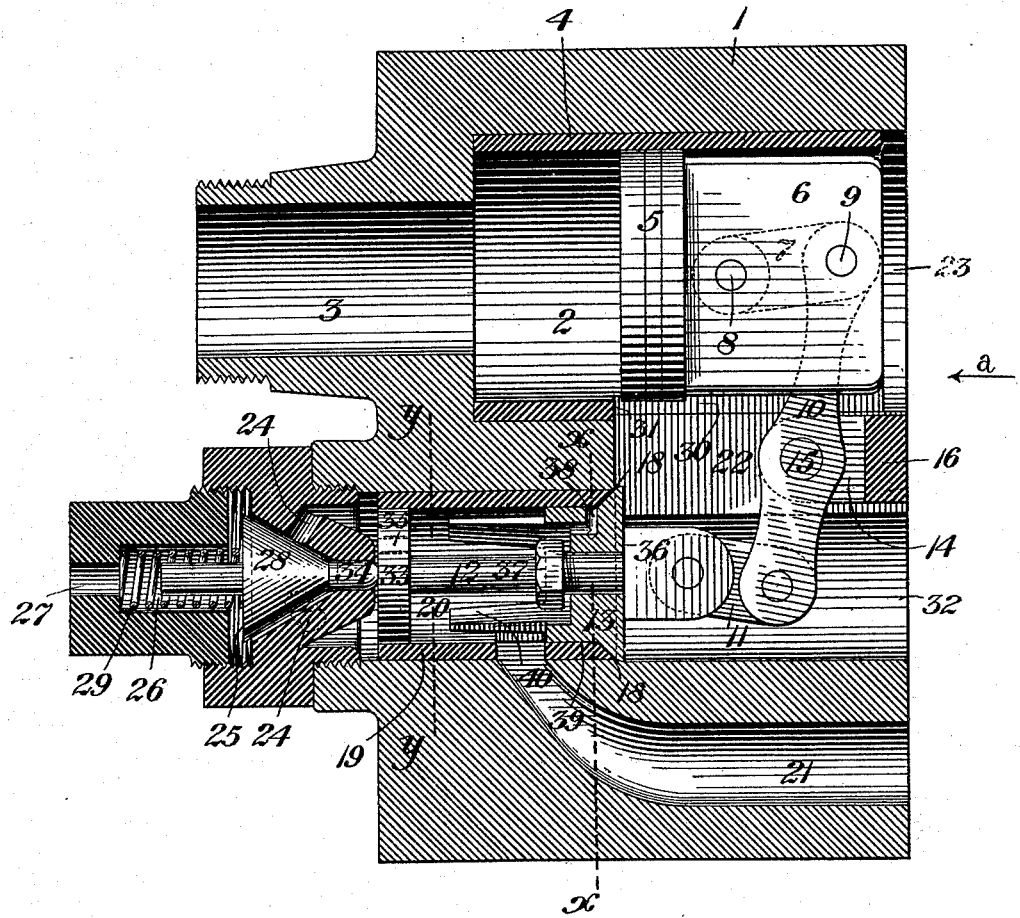
Figure 2:
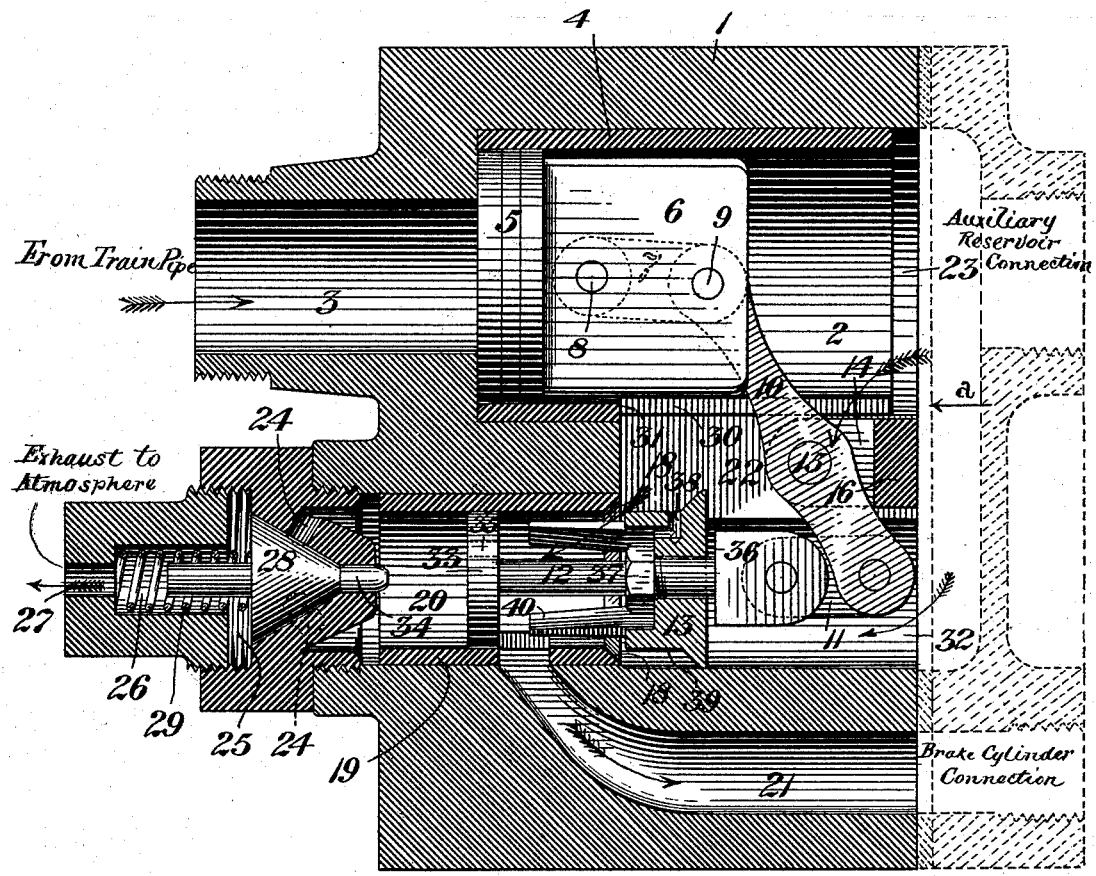

In the accompanying drawings, which illustrate my invention, Figure 1 is a central section through my improved triple valve device, showing the parts in their normal positions; Fig. 2, a similar section, showing the parts in the positions which they occupy in making a quick service application of the brakes; Fig. 3, an end elevation of my triple valve device, looking in the direction shown by the arrow $a$ in Figs. 1 and 2; Fig. 4, a transverse section through the main valve of the triple valve, on the line $x, x$, of Fig. 1; Fig. 5, a transverse section on the line $y, y$, of Fig. 1; Fig. 6, a side elevation of the main valve of the triple valve; Fig. 7, an end elevation of the main valve shown in Fig. 6.

The casing 1 of the triple valve has a chamber, 2, formed therein which communicates at one end, through the opening 23, with the auxiliary reservoir, and at the other end, by means of a passage, 3, with the train pipe. The chamber 2 is lined with a bushing, 4, within which a movable abutment, diaphragm or piston, 5, is fitted to work. On the side of the piston 5 which is exposed to auxiliary reservoir pressure are two lugs 6, which may be formed integral with or secured to the piston in any suitable manner. A link 7 is pivoted at one end, by means of a pin 8, to the lugs 6, and at its other end, by means of a pin 9, to one end of a lever 10. The lever 10 is similarly connected at its other end, by means of a link 11, with the stem 12 of the main valve 13, and is pivoted between its ends, by means of a pin 15, to a lug 14 which projects from a cross bar 16 which is fixed to the casing 1 by means of screw bolts 17, as shown in Fig. 3.

The main valve, 13, is a puppet valve, and has a seat 18 formed on the end of a bushing 19, fitted in a chamber 20 which is always in communication with the brake cylinder through the passage 21. A cylindrical projection, 39, is formed on one side of the valve 13, and is fitted to slide in the bushing 19 in such a manner as to prevent the passage of any appreciable quantity of fluid around it when the conical portion of the valve 13 is lifted from its seat. A port 38, in the cylindrical projection 39, forms a graduating port, through which fluid is admitted in limited quantity from the auxiliary reservoir to the brake cylinder, when the valve 13 is lifted but a short distance from its seat. The guides, 40, serve to center the valve when it is moved far enough from its seat to withdraw the cylindrical portion 39 entirely from the bushing 19, as is the case in quickly charging the brake cylinders. Exhaust ports or passages, 24, lead from the chamber 20 to the chamber 25 which is open to the atmosphere through the passages 26 and 27. The exhaust ports 24 are controlled by an exhaust valve 28 which is normally open to permit the brake cylinder to communicate with the atmosphere, and which is seated by means of a spring 29 to cut off communication between the brake cylinder and the atmosphere.

When the train pipe is charged with fluid under pressure, for the purpose of releasing the brakes, the fluid from the train pipe flows through the passage 3 into the chamber 2, and moves the piston 5 to the position shown in Fig. 1. The bushing 4 has a slot 30 formed in one side of it, and one extremity, 31, of this slot is uncovered by the piston 5 when the piston is moved to release position, thereby forming a feed passage through which fluid under pressure may flow from the train pipe into chamber 22 and into the portion of chamber 2 on the right of piston 5, and thence through the passages 32 and 23 to the auxiliary reservoir.

The movement of the piston 5 to release position, as shown in Fig. 1, swings the lever 10 on its fulcrum, and closes the main valve 13, thereby cutting off communication between the auxiliary reservoir space and the chamber 20 and brake cylinder passage 21. At the same time, the stem 12, or the piston 33 on its end, comes in contact with the stem 34 of the exhaust valve 28 and unseats it, thereby opening communication from the brake cylinder through passage 21, chamber 20, ports 35 in the piston 33, ports 24, chamber 25, and passages 26 and 27 to the atmosphere. The stem 12 passes through a central opening in the main valve 13, and is fitted in the opening in such a manner as so permit longitudinal movement of the stem independent of the valve without permitting any appreciable amount of fluid to leak through around the stem. The independent movement of the stem relative to the valve is limited by the shoulder 36, formed by the head of the stem, on one side of the valve, and by the nut 37 which is screwed on the stem on the other side of the valve.

When it is desired to produce a graduated application of the brakes a slight reduction of train pipe pressure will permit the auxiliary reservoir pressure to move the piston 5 to the left far enough to close the feed passage 31, formed by the end of the slot 30, and thereby cut off communication between the train pipe and auxiliary reservoir. The same movement of the piston acting through the link 7, lever 10, and link 11, moves the stem 12 to the right far enough to permit the spring 29 to seat the exhaust valve 28 and cut off the communication from the brake cylinder and chamber 20 to the atmosphere. Any further movement of the piston 5 to the left will bring the nut 37 in contact with the valve 13 and lift it from its seat far enough to open the port 38 and permit fluid from the auxiliary reservoir to flow through port 38, chamber 20, and passage 21, to the brake cylinder, thereby applying the brakes. The port 38 is formed in the cylindrical portion 39 of the valve, and is only uncovered when the valve is lifted from its seat. In making graduated applications of the brakes the cylindrical portion 39 of the valve may be only partly withdrawn from the bushing 19, that is, far enough to open the port 38. In case the reduction of train pipe pressure has been slight the release of fluid from the auxiliary reservoir to the brake cylinder, through the port 38, will soon reduce the auxiliary reservoir pressure until it is nearly equal to the train pipe pressure, and the auxiliary reservoir pressure acting on the back of the main valve 13 will then close the main valve and cut off the flow of fluid from the auxiliary reservoir to the brake cylinder.

If it is desired to increase the pressure in the brake cylinder the train pipe pressure may be further reduced and the main valve again lifted from its seat so as to open the graduating port 38 and permit more fluid to pass from the auxiliary reservoir to the brake cylinder. This process may be repeated as many times as desired until the limit of pressure has been reached in the brake cylinder, that is, until the auxiliary reservoir and brake cylinder pressures have equalized. In making such a graduated application of the brakes, the main valve 13 is seated by the auxiliary reservoir pressure on its back acting against the brake cylinder pressure on its other side, and against the excess of auxiliary reservoir pressure over train pipe pressure on the nearly balanced piston 5. The valve 13, in returning to its seat, pulls on the lever 10 and piston 15, instead of being pushed by them, and remains in contact with the nut 37 on the stem 12 after being seated. The exhaust valve 28, therefore, remains on its seat and the fluid which has been admitted to the brake cylinder is retained therein.

When it is desired to quickly charge the brake cylinder, without graduating, a comparatively large reduction of train pipe pressure is made, which causes the piston 5 to move to the left to the extremity of its stroke in that direction, as shown in Fig. 2. This movement of the piston 5 moves the valve 13 far enough from its seat to withdraw the cylindrical portion 39 entirely from the bushing 19, thereby opening a large passage through which fluid under pressure flows from the auxiliary reservoir to the brake cylinder until the auxiliary reservoir and brake cylinder pressures are equalized. In order to make such quick application of the brakes the reduction of train pipe pressure should be such that the final train pipe pressure is somewhat less than the pressure at which the auxiliary reservoir and brake cylinder pressures are equalized.

The stem 12, which passes through the valve 13, is guided by means of the disk or piston 33 which is fitted to slide in the bushing 19. Instead of a disk, or piston, with the perforations 35, a ring connected to the stem 12 by means of webs or spokes may be employed, the openings or spaces between the webs or spokes taking the place of the openings 35. Or, if preferred, the stem 12 may be provided with wings or projections which serve as guides.

The main valve 13 is provided with guides 40, as clearly shown in Fig. 6, which project from the cylindrical portion 39 of the valve. These guides are never entirely withdrawn from the bushing 19, even when the valve is wide open as shown in Fig. 2.

The lever 10, by means of which the movable abutment, or piston, 5, is connected to the main valve, has its fulcrum nearer to the valve than to the piston, so that the piston is connected to the long arm of the lever and the valve to the short arm. I do not limit myself to this particular arrangement, but it may be preferred because by its employment the diameter of the piston may be made less than would be necessary if the lever were pivoted in the middle or nearer to the piston than to the valve.

The back of the valve 13 and the shoulder 36 should be so finished that, when the valve is on its seat and the shoulder bears on the valve, they fit closely together and form a tight joint to prevent the passage of fluid under pressure. If preferred a seat may be formed on the valve or shoulder and fitted with a packing or gasket to form a tight joint where the parts come together.

I claim as my invention and desire to secure by Letters Patent—

1. The combination in a triple valve device of a movable abutment, a main valve controlling the passage of fluid from the auxiliary reservoir to the brake cylinder, a stem connected to and movable independent of the main valve, and a lever connection from the movable abutment to the stem, substantially as set forth.

2. The combination in a triple valve device of a movable abutment, a main valve, a lever connection between the abutment and the main valve, and a separate exhaust valve, substantially as set forth.

3. The combination in a triple valve device of a movable abutment, a puppet valve connected to the movable abutment by means of a lever connection, and a graduating port formed in the valve for releasing fluid under pressure from the auxiliary reservoir to the brake cylinder in making graduated applications of the brakes, substantially as set forth.

In testimony whereof I have hereunto set my hand.

JOSEPH SOUCEK.

Witnesses:
T. J. HOGAN,
DARWIN S. WOLCOTT.